(12) United States Patent
Westberg et al.

(10) Patent No.: US 9,046,547 B2
(45) Date of Patent: Jun. 2, 2015

(54) ACCELEROMETER HAVING MULTIPLE FEEDBACK SYSTEMS OPERATING ON A GIVEN PROOF MASS

(75) Inventors: Knut David Westberg, Uppsala (SE); Mats Lennart Carlsson, Sundbyberg (SE); Erik Andreas Dreyfert, Stockholm (SE); Milena Anguelova, Lindome (SE)

(73) Assignee: PGS Geophysical AS, Oslo (NO)

( * ) Notice: Subject to any disclaimer, the term of this patent is extended or adjusted under 35 U.S.C. 154(b) by 280 days.

(21) Appl. No.: 13/584,014

(22) Filed: Aug. 13, 2012

(65) Prior Publication Data

US 2014/0041452 A1 Feb. 13, 2014

(51) Int. Cl.
*G01P 15/13* (2006.01)
*G01P 15/125* (2006.01)

(52) U.S. Cl.
CPC ............ *G01P 15/131* (2013.01); *G01P 15/125* (2013.01)

(58) Field of Classification Search
USPC ............... 73/514.17, 514.18, 514.32, 514.36, 73/514.38
See application file for complete search history.

(56) References Cited

U.S. PATENT DOCUMENTS

| | | | | |
|---|---|---|---|---|
| 4,932,261 A * | 6/1990 | Henrion | ................ | 73/514.18 |
| 4,987,779 A * | 1/1991 | McBrien | ................ | 73/514.18 |
| 5,205,171 A * | 4/1993 | O'Brien et al. | ........... | 73/514.18 |
| 5,440,939 A * | 8/1995 | Barny et al. | ............... | 73/862.61 |
| 5,454,266 A * | 10/1995 | Chevroulet et al. | ........ | 73/514.18 |
| 5,497,660 A * | 3/1996 | Warren | ................... | 73/514.18 |
| 5,652,384 A * | 7/1997 | Henrion et al. | ........... | 73/514.24 |
| 6,360,602 B1 * | 3/2002 | Tazartes et al. | ........... | 73/514.18 |
| 6,386,032 B1 * | 5/2002 | Lemkin et al. | ............. | 73/504.02 |
| 6,504,385 B2 * | 1/2003 | Hartwell et al. | .............. | 324/662 |
| 6,871,544 B1 * | 3/2005 | Selvakumar et al. | ...... | 73/514.18 |
| 7,155,979 B2 * | 1/2007 | Lasalandra et al. | ........ | 73/514.18 |
| 7,614,300 B2 * | 11/2009 | Stewart et al. | ............. | 73/514.18 |
| 8,104,346 B2 * | 1/2012 | Paulson | .................... | 73/514.32 |

(Continued)

FOREIGN PATENT DOCUMENTS

GB 2424953 A 11/2006
GB 2498079 A 1/2013

(Continued)

OTHER PUBLICATIONS

Search Report issued in patent application No. GB1313690.8 and from the United Kingdom Intellectual Property Office, datedJan. 20, 2014, 2 pages.

(Continued)

*Primary Examiner* — Helen Kwok

(57) ABSTRACT

Certain disclosed accelerometer sensors and methods employ a proof mass that is acted upon by multiple feedback paths. One illustrative sensor embodiment includes an electrode arrangement proximate to a proof mass, the electrode arrangement providing multiple electrostatic force centroids on the proof mass. The sensor embodiment further includes multiple feedback paths, each feedback path independently controlling an electrostatic force for a respective centroid, and an output unit that converts signals from the multiple feedback paths into an acceleration-responsive output signal. An illustrative method embodiment derives multiple feedback signals from at least one displacement signal, applies the multiple feedback signals to an arrangement of electrodes that capacitively couple the proof mass to a substrate, and converts the multiple feedback signals into an acceleration signal.

18 Claims, 3 Drawing Sheets

(56) References Cited

U.S. PATENT DOCUMENTS

| | | | |
|---|---|---|---|
| 8,599,054 B2 * | 12/2013 | Carlsson et al. | 341/143 |
| 8,661,901 B2 * | 3/2014 | Walmsley | 73/514.32 |
| 2011/0115501 A1 | 5/2011 | He et al. | |

FOREIGN PATENT DOCUMENTS

| | | |
|---|---|---|
| WO | 9533208 | 12/1995 |
| WO | 2008088644 A1 | 7/2008 |
| WO | 2011142754 A1 | 11/2011 |

OTHER PUBLICATIONS

Dong, Yufeng et al., "A High-Performance Accelerometer with a Fifth-Order Sigma-Delta Modulator"; *Institute of Physics Publishing, Journal of Micromechanics and Microenoineering*; University of Southampton, Highfield. UK. Received Nov. 26, 2004, in final form Mar. 6, 2005; Online at <https://stacks.iop.org/JMM/15/S22>, (Jun. 20, 2005), S22-S29.

Zwahlen, Pascal et al., "Navigation Grade MEMS Accelerometer", *Proceedings of the International Conf. on MEMS*; Wanchai, Hong Kong, Jan. 2010; Online at <http://www.schmidwerren.ch/hanspeter/publications/2010mems.pdf>, 4 pgs.

Kulah, Haluk et al., "Noise Analysis and Characterization of a Sigma-Delta Capacitive Microaccelerometer"; *IEEE Journal of Solid-State Circuits*; vol. 41, No. 2, Feb. 2006; pp. 352-361.

Henrion, Widge et al., "Wide Dynamic Range Direct Digital Accelerometer"; *Solid-State Sensor and Actuator Workshop*; 4th IEEE Technical Digest; (Jun. 4, 1990); pp. 153-157.

\* cited by examiner

ACCELEROMETER HAVING MULTIPLE FEEDBACK SYSTEMS OPERATING ON A GIVEN PROOF MASS

BACKGROUND

The term microelectromechanical systems ("MEMS") refers to devices having very small components (typically in the range of 1 µm to 1 cm) which often operate as sensors. Electronics may be integrated into the devices to convert physical effects (such as displacement of a proof mass) into electrical output signals. High performance MEMS sensor systems are typically based on closed-loop architectures to provide good linearity and large dynamic range. As one example of such architectures, many systems reported in the literature use sigma-delta modulated single-bit feedback with a MEMS proof mass as an integrated part of the loop filter.

H. Paulson, "MEMS-Based Capacitive Sensor", U.S. Pat. No. 8,104,346, Jan. 31, 2012, employs this architecture in a capacitive-coupled MEMS accelerometer and provides a lucid explanation of the underlying principles. Naturally, the single-bit feedback system creates a substantial amount of quantization noise which others have attempted to address through various means. For example, the mechanical part of a voltage driven micro-machined inertial sensor can be described as a harmonic oscillator described by a second-order characteristic function. To reduce the in-band quantization noise, the loop filter can add electrically determined poles to the system transfer function. This approach has been demonstrated by Y. Dong, M. Kraft, C. Goilasch and W. Redman-White, "A high-performance accelerometer with a fifth-order sigma-delta modulator", J. Micromechanics & Microengineering, 15 (2005) pp 22-29. They created a fifth order system by introducing three electrical poles.

A similar architecture is employed in a state-of-the-art device by H. Kulah, J. Chae, N. Yazdi, K. Najafi, "Noise analysis and characterization of a sigma-delta capacitive microaccelerometer", IEEE J. Solid-State Circuits, 41 (2006), pp 352-361. They conclude that mass-residual motion is the dominant noise source at low sampling frequencies for systems operated in closed-loop mode, and suggest that the best way to overcome this limitation is by increasing the sampling frequency.

Another state-of-the-art example can be found in P. Zwahlen, A. Nguyen, Y. Dong, F. Rudolf, M. Pastre, H. Schmid, "Navigation-grade MEMS accelerometer", published by Colibry, www.colibrys.com. They present both simulated and measured data, showing what they claim is excellent matching between simulation and measurement. However, careful inspection of their results indicates that in the frequency range from 500 Hz to 1 kHz they have "smearing" of high frequency quantization noise down into the upper part of the passband. We attribute this discrepancy to mass-residual motion.

Thus the conventional techniques for providing a high-performance MEMS accelerometer include the use of a single-bit sigma-delta feedback architecture with a high-order loop filter and/or a substantially elevated clock rate. These techniques add an undesirable performance requirements and complexity for the integrated electronics and, for the reasons explained further herein, can provide only a limited amount of performance improvement.

BRIEF DESCRIPTION OF THE DRAWINGS

Accordingly, there are disclosed herein methods for improving MEMS accelerometer performance through the use of multiple feedback architecture for a given proof mass, and accelerometers employing such methods. In the drawings.

Figure 1:
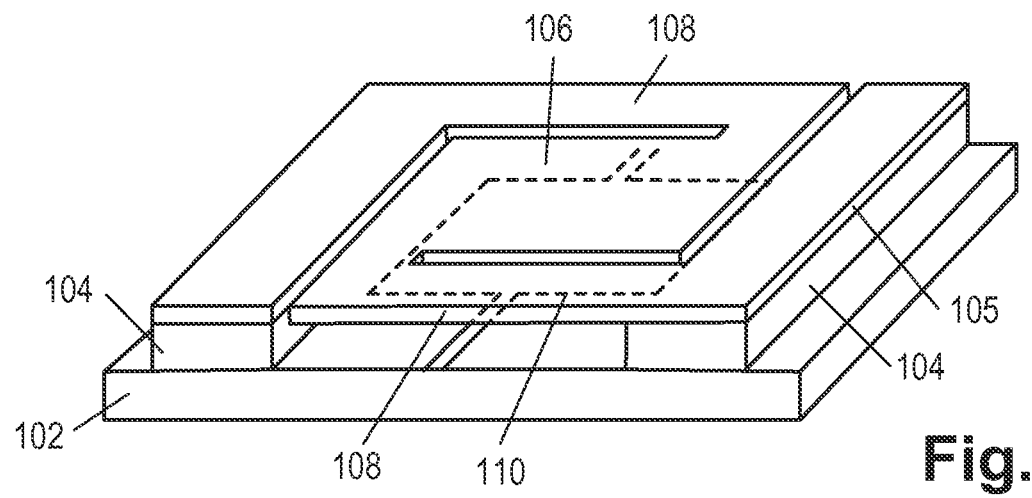
FIG. 1 shows a first illustrative MEMS proof mass configuration.

It should be understood that the specific embodiments given in the drawings and detailed description below do not limit the disclosure. On the contrary, they provide the foundation for one of ordinary skill in the art to discern the alternative forms, equivalents, and other modifications that are encompassed in the scope of the claims.

DETAILED DESCRIPTION

FIG. 1 shows a first illustrative microelectromechanical systems ("MEMS") component that can serve as a proof mass for embodiments of an accelerometer disclosed herein. A layer 105 is supported over an upper surface of a substrate 102 by one or more supports 104. (Note that "upper" and "lower" are used herein as descriptive terms with respect to the Drawings, and such terms are not intended to limit the orientation of embodiments of the invention in practice.) A movable proof mass 106 and one or more deformable arms or beams 108 are formed in the layer 105 such that the proof mass 106 is suspended over the upper surface of the substrate 102 by the arms or beams 108. A single electrode 110 is formed on the upper surface of a substrate 102 adjacent the proof mass 106. The supports 104 and the top layer 105 define a cavity over the electrode 110. As described in more detail below (see FIG. 3), a second electrode is formed on a layer (e.g., a "cap layer") positioned above the proof mass 106 to provide an additional degree of sensitivity and control. It is emphasized that this particular proof mass configuration is merely illustrative—other designs employing cantilevers, springs, and gas cushions are also known and may be suitable depending on the chosen application. The contemplated dimensions of the proof mass 106 are 3×2×0.5 mm, though this may vary based on design constraints. The substrate 102 may be or include, for example, silicon, ceramic, sapphire, silicon carbide, glass, metal, and/or plastic.

Figure 2:
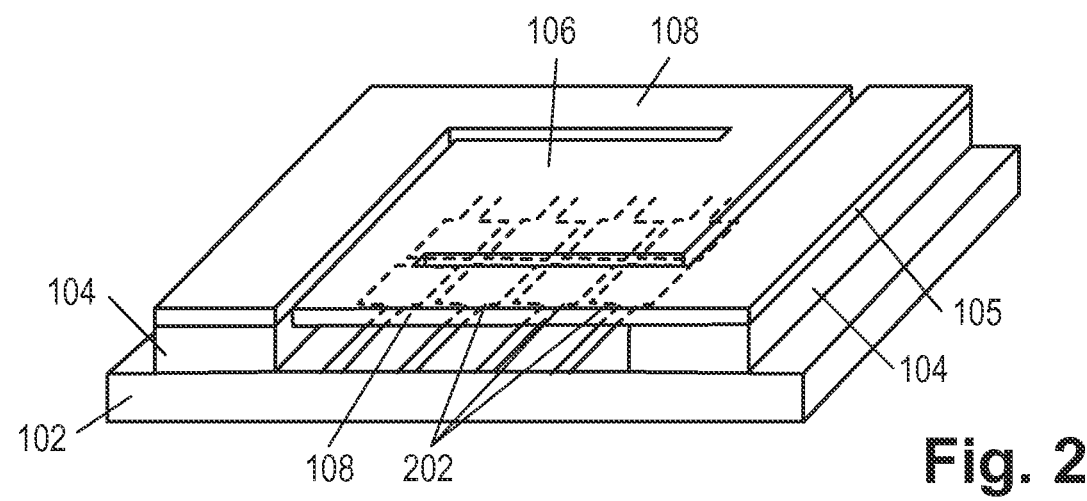
FIG. 2 shows a second illustrative MEMS proof mass configuration.

FIG. 2 shows a second illustrative MEMS component that can also serve as a proof mass for embodiments of an accelerometer. Elements of the MEMS proof mass configuration shown in FIG. 1 and described above are labeled similarly in FIG. 2. In the MEMS proof mass configuration of FIG. 2, an array of electrodes 202 is formed on the upper surface of a substrate 102 adjacent the proof mass 106. As described in more detail below (see FIG. 3), a second array of electrodes is formed on a layer (e.g., a "cap layer") positioned above the proof mass 106 to provide an additional degree of sensitivity and control.

To provide capacitive coupling with the electrodes, the moveable proof mass 106 is made from a conductive material or at least coated with a layer of conductive material. The electrodes and the proof mass 106 are coupled to electronics that sense and control the relative voltages between the electrodes and the proof mass 106. Such electronics are expected to be included in the packaging for an electronic component. In some embodiments, the electronics may be integrated on substrate 102 with the proof mass 106.

Figure 3:
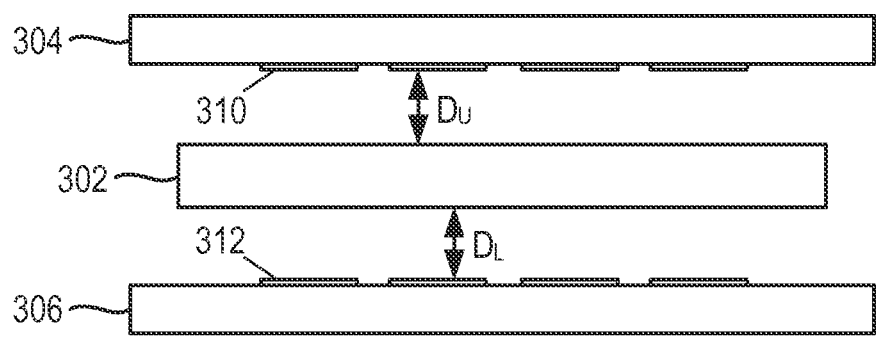
FIG. 3 is a cross-section of an illustrative MEMS accelerometer configuration.

FIG. 3 shows a cross-section of an accelerometer's MEMS component having a proof mass 302 positioned between a cap layer 304 and a substrate 306. An upper array of electrodes 310 are positioned on the cap layer 304 at a distance $D_U$ from a conductive surface on the proof mass 302 and a lower array of electrodes 312 are positioned on the substrate at a distance $D_L$ from the conductive surface on the proof mass 302. $D_U$ and $D_L$ are nominally the same, though subject to change by displacement of the proof mass 302. In some embodiments, the contemplated values for $D_U$ and $D_L$ are on the order of 2 µm.

Figure 4:
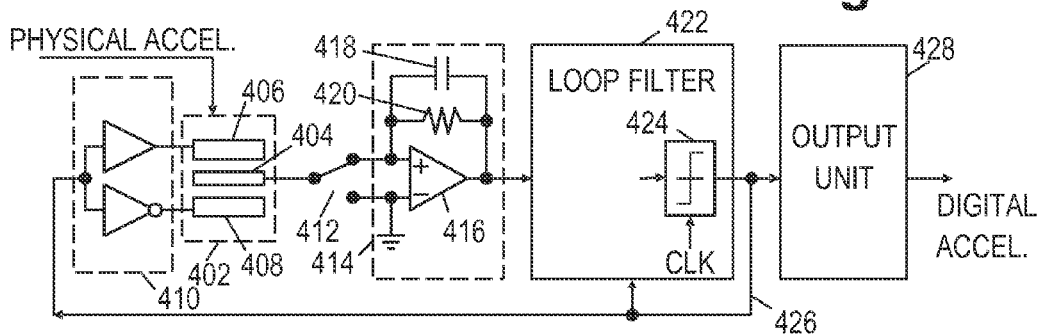
FIG. 4 is a schematic of an illustrative single-feedback architecture.

FIG. 4 is a schematic of an illustrative sigma-delta ("ΣΔ") feedback architecture suitable for use with a conventional MEMS transducer 402. The illustrated transducer 402 has a proof mass 404 positioned approximately midway between an upper electrode 406 and a lower electrode 408. A driver 410 applies feedback voltages along feedback paths to the upper and lower electrodes 406, 408. The proof mass 404 may initially be set at ground voltage by switch 412 and thereafter maintained there by charge amplifier 414, though in some embodiments the switch can also operate to isolate the charge amplifier momentarily to minimize transients as the drivers 410 change the electrode polarity. The proof mass 404 may experience a net upward or downward electrostatic force based on the polarity of the feedback signal (which alternates). As the proof mass 404 experiences inertial forces due to physical acceleration of the transducer, the feedback architecture modifies the feedback signal to counteract (on average) any displacement of the proof mass 404.

Charge amplifier 414 employs an op-amp 416 with a feedback capacitance 418 and feedback resistance 420 to convert any capacitance changes into a voltage input signal for an electrical portion of a loop filter 422. Herein below, the electrical portion of the loop filter 422 will be referred to simply as "loop filter 422." In the embodiment of FIG. 4 the loop filter 422 includes a one-bit quantizer 424, and provides a digital feedback signal via feedback path 426 to the loop filter 422 and the driver 410. We note here that the feedback resistance 420 is optional, and the order of the blocks in FIG. 4 can be varied. In particular, it is not a requirement that the quantizer 424 be included in the loop filter 422. In some embodiments the quantizer 424 may be downstream from the loop filter 422, or at the input to the loop filter 422.

The feedback signal on feedback path 426 may be a binary pulse signal having a sliding mean value (or equivalently, a duty cycle or pulse density) proportional to an average force required to maintain the proof mass 404 at a neutral position, which in turn is proportional to the physical acceleration being applied to the transducer 402. An output unit 428 converts the feedback signal into a digital representation of the acceleration operating on the proof mass 404. The output unit 428 may include, for example, a decimation filter. In an alternative embodiment, the output unit 428 produces an analog voltage proportional to the feedback signal's sliding mean value.

Figure 5:
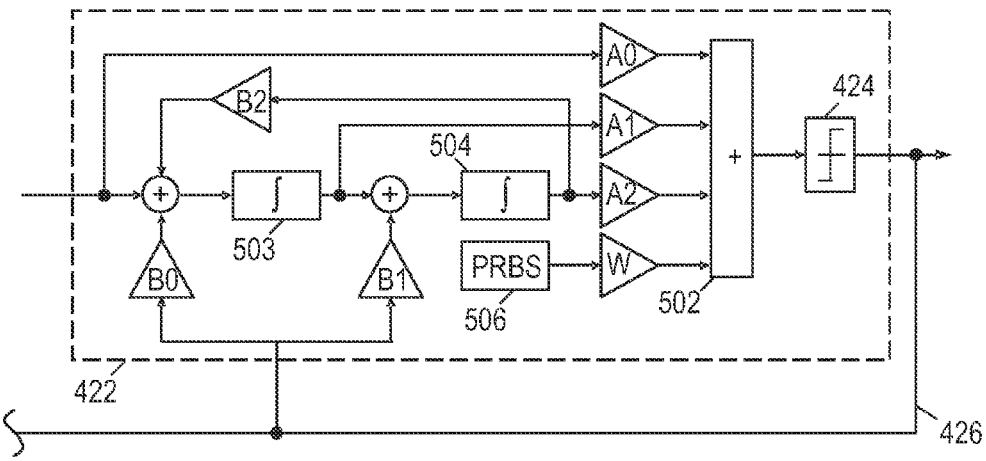
FIG. 5 is a schematic of an electrical portion of an illustrative loop filter.

FIG. 5 shows an illustrative (electrical portion of) loop filter 422 suitable for use with the architecture of FIG. 4, though other filter architectures are known and can also be used. As described above, the loop filter 422 includes the quantizer 424 that generates the feedback signal on feedback path 426. The quantizer 424 quantizes the output of a summation node 502 that combines together: a scaled version of the input signal; a scaled version of the output from a first integrator 503; a scaled version of the output from a second integrator 504; and a scaled version of a pseudorandom binary sequence. The first integrator 503 integrates the sum of: the input signal; a scaled version of the output from the second integrator 504; and a scaled version of the feedback signal. The second integrator 504 integrates the sum of the output from the first integrator 503 with a scaled version of the feedback signal on feedback path 426. The various scale factors are set based on desired performance criteria and in some cases may be adaptive.

Having outlined the structure and operation of an illustrative MEMS accelerometer, we recall from the background discussion that the residual motion of the proof mass (i.e., proof mass displacement noise) is a dominant source of error for high performance systems. The reason that residual motion has such a negative impact on voltage-driven capacitive MEMS system performance is the fact that displacement results in non-linear feedback. The electrostatic force F between the electrodes of a plate capacitor is proportional to the charge Q squared $$F = Q^2/2 \in A \tag{1}$$

where $\in$ is the dielectric permittivity, A is the plate area, and charge Q is given by $$Q = CV \tag{2}$$

with V being the voltage difference between the plates and the capacitance C given by $$C = \in A/d \tag{3}$$

where d is the distance between the plates.

With voltage driven feedback, the electrode voltage V is essentially fixed and the variation in capacitance C determines the force. When the proof mass is displaced, the capacitance deviation from its nominal value is different for the upper and lower capacitances since C is proportional to the inverse of the electrode gap d. With a downwards displacement $\Delta d$, the resulting electrostatic force upwards and downwards will be $$F_U = \in A V_U^2 / 2(d_0 + \Delta d)^2 \tag{4a}$$

$$F_L = \in A V_L^2 / 2(d_0 - \Delta d)^2 \tag{4b}$$

The premise underlying ΣΔ feedback signaling to cancel the input acceleration is the use of a known feedback value, i.e., $F_U$ and $F_L$. However, the actual dynamic gap value, $(d_0 + \Delta d)$, is not known by the system. Instead the system read-out is based on the known nominal gap $d_0$. This means that any displacement will result in an unknown non-linear feedback causing signal distortion and downconversion of high frequency quantization noise. In a high performance voltage driven system it is therefore important that the displacement is modeled and the system optimized to minimize displacement effects.

An important consideration that appears to be neglected by existing literature is the presence of secondary and higher-order vibration modes. In addition to the primary mode (vertical vibration of the proof mass), there may be secondary modes such as longitudinal rocking, diagonal rocking, and beam modes (standing waves in the support arms), as well as higher-order resonances in each mode. We have discovered that such additional modes can cause substantial residual motion effects, and in some cases may even be the dominant source of proof mass displacement noise. (We note here that while vertical vibration of the proof mass is the primary mode in the embodiments shown and described, it is also possible to use proof mass finger structures and allow the primary mode to be horizontal vibration.)

Accordingly, we disclose herein certain alternative embodiments that efficiently suppress any such additional noise-producing modes without requiring knowledge of the specific mode geometries or their resonant frequencies. These embodiments employ multiple independent feedback paths that each operate on the same proof mass.

Figure 6:
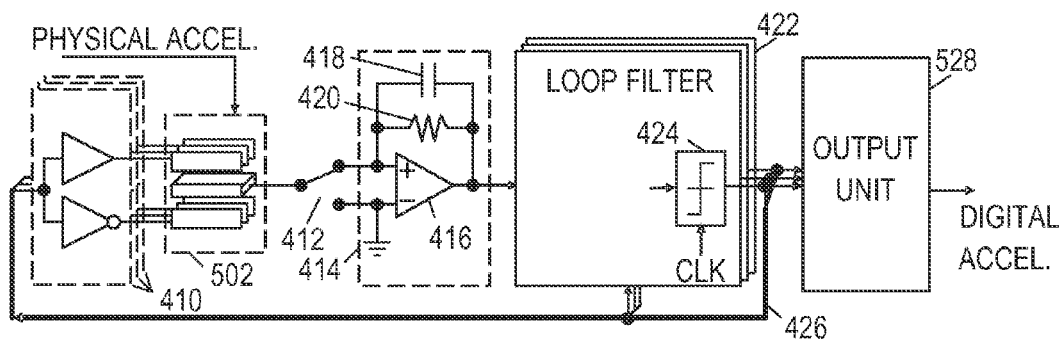
FIG. 6 is a schematic of an illustrative multi-feedback architecture.

FIG. 6 is a schematic of an illustrative ΣΔ feedback architecture suitable for use with an enhanced MEMS transducer 502. Transducer 502 has a proof mass positioned between an upper array of electrodes and a lower array of electrodes as discussed previously with respect to FIGS. 2 and 3. The multiple electrodes enable the use of multiple feedback paths that operate on the same proof mass. In FIG. 6, three feedback paths are shown but the actual number of systems could be higher or lower.

Three drivers 410 are shown for applying feedback voltages to oppositely-positioned electrodes. As before, the proof mass experiences a net upward or downward electrostatic force based on the combined effects of the feedback signals. Charge amplifier 414 converts displacement of the proof mass into a voltage signal for three loop filters 422. At different times, each loop filter 422, together with its respective quantizer 424, provides a digital feedback signal on feedback path 426 to a corresponding driver 410. As the operation of the quantizers 424 is time-multiplexed, the feedback signal changes occur at different times and the operation of the different feedback paths need not correspond even though they share a common input signal.

The output unit 528 converts the three feedback signals into a combined representation of the acceleration operating on the proof mass. In one implementation, the sliding mean value for each feedback signal is determined and, with appropriate offsets and scaling, the rates are summed to provide the output signal.

Figure 7:
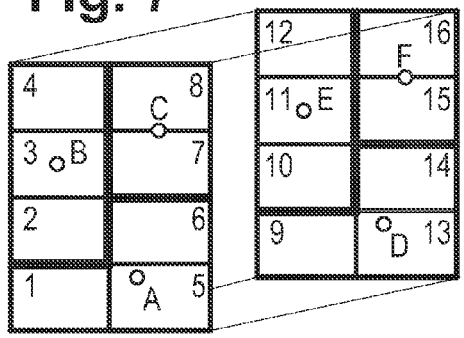
FIG. 7 shows an illustrative electrode configuration.

FIG. 7 shows an illustrative configuration for the upper array of electrodes (numbered 1-8) and the lower array of electrodes (numbered 9-16) that may be employed in the MEMS component of FIGS. 2, 3, and 6. Arrays of eight elementary electrodes have been chosen here for manufacturing convenience. The elementary electrodes can be grouped as desired into larger effective electrodes by electrically coupling them together. In FIG. 7, elementary electrodes 1, 5, 6 have been grouped together as electrode A, elementary electrodes 2, 3, 4 grouped as electrode B, and elementary electrodes 7, 8 grouped as electrode C. (If desired, the smaller area of electrode C can be compensated by driving the electrode with a slightly larger voltage—see equation (4)). The lower electrode array has been similarly grouped to form electrodes D, E, and F, with D opposite A, E opposite B, and F opposite C. The electrostatic force centroids for each electrode are marked with a small circle. These centroids are the locations at which a point force can be considered equivalent to the electrode's distributed electrostatic force. The centroids on the upper array, the proof mass, and the lower array are vertically aligned.

The shortcoming of a single electrode system may be understood by comparing the proof mass to the seat of a stool which we desire to keep in a horizontal position even as gravity is acting on it. While it is theoretically possible theoretically possible to achieve this state with a single support (assuming the precise load point is known), the seat will nevertheless tilt with only the smallest of misalignments. If instead the seat is provided with three supports, the horizontal position can be maintained over a wide range of loading conditions, particularly when the supports can provide both upwards and downwards forces. So it is with the proof mass. The electrode arrangement in FIG. 7 provides a triangular support arrangement (note the arrangement of the centroids) with bidirectional force capability. This non-collinear arrangement operates to maintain the parallel orientation of the proof mass by suppressing any tilting or rotational modes.

To ensure that the system remains linear regardless of the applied electrode mismatch, each effective electrode is driven as a single-bit system. A single-bit system is per definition linear since it only has two values which always will fall onto a straight line. Nevertheless, the operation of multiple single-bit systems on the same proof mass still offers multi-bit properties to the vertical eigenmodes. In total these modes will be subject to the following normalized forces: +3/3, +1/3, −1/3, −3/3. This multi-bit effect reduces the quantization noise by 6 dB for these modes compared to a true single-bit system. Though substantial accuracy gains are anticipated, the expected penalty for this architecture is the increased power consumption required by the three loop filters.

Figure 8:
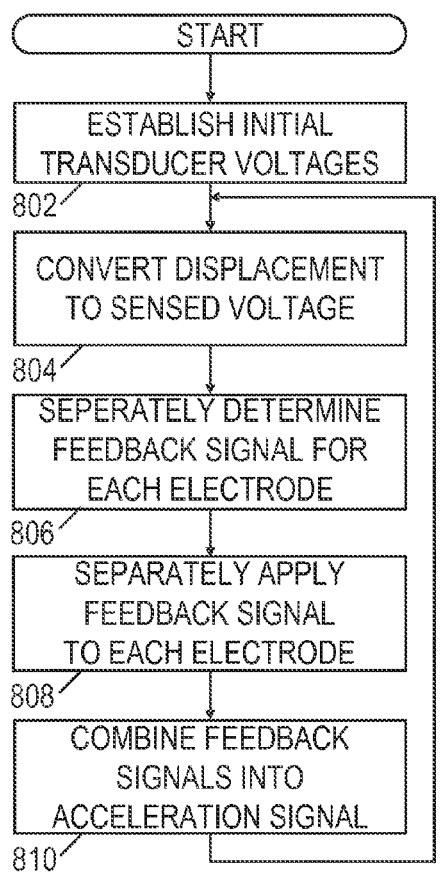
FIG. 8 is a flowchart of an illustrative sensing method.

FIG. 8 is a flowchart of one an illustrative method embodiment that may be implemented by the disclosed accelerometer configuration. In block 802, the initial electrode voltages are established by one or more drivers 410. In block 804 any displacement of the proof mass is converted to a voltage signal by a charge amplifier. In block 806, a separate feedback signal is determined for each of multiple opposed pairs of electrodes. This can be done using a time-multiplexed approach. In block 808 the drivers 410 apply each feedback signal to a respective electrode pair. In block 810, an output unit processes the feedback signals to determine an output signal representing the applied acceleration.

Figure 9:
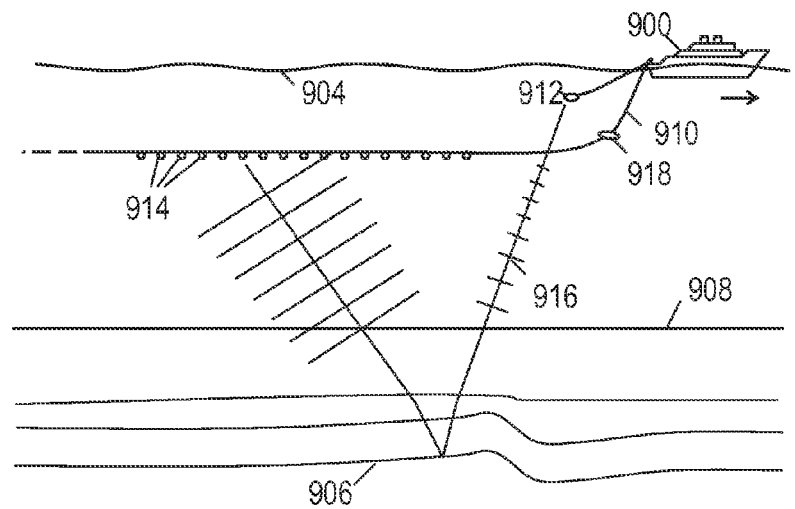
FIG. 9 shows an illustrative marine seismic survey system.

The disclosed accelerometer methods and devices are suitable for use in a wide variety of applications. FIG. 9 shows one illustrative application: a seismic survey system. In the illustrative seismic survey system of FIG. 9, a survey ship 900 is moving along the surface of a body of water 904, such as a lake or an ocean. A data processing system on board the ship 900 is coupled to at least one seismic source 912 and at least one streamer 910 having an array of seismic sensor modules 914. As the ship tows the source(s) and streamer(s) through the water, steering devices attached to the source and streamers (e.g., device 918) maintain their depth and relative position.

The seismic source 912 produces acoustic waves 916 under the control of the data processing system, e.g. at selected times. The seismic source 912 may be or include, for example, an air gun, a vibrator, or other device. The acoustic waves 912 travel through the water 904 and into a subsurface 908. When the acoustic waves 912 encounter changes in acoustic impedance (e.g., at boundaries or layers between strata), portions of the acoustic waves 916 are reflected. The portions of the acoustic waves 916 reflected from subsurface layers are called "seismic reflections". In FIG. 9, one such seismic reflection is shown from an interface labeled 906.

Accelerometers in the seismic sensor modules 914 detect these seismic reflections and produce highly accurate output signals indicative of the seismic reflections. The output signals produced by the sensor units are recorded by the data processing aboard the ship 900. The recorded signals can be processed and later interpreted to infer structure of, fluid content of, and/or composition of rock formations in the subsurface 908.

Numerous variations and modifications will become apparent to those skilled in the art once the above disclosure is fully appreciated. For example, the time-multiplexed operation of the loop filters can be replaced by fully parallel operation if the conductive surface of the proof mass is split into multiple electrodes corresponding to the outer electrode pairs. Each proof mass electrode can then be monitored by a separate charge amplifier, making the multiple feedback paths fully parallel and independent but for their operation on a single proof mass. It is intended that the following claims be interpreted to embrace all such variations and modifications.

What is claimed is:

1. An accelerometer that comprises:
   an electrode arrangement proximate to or part of a proof mass, the electrode arrangement providing multiple electrostatic force centroids, wherein the electrode arrangement provides at least three non-collinear electrostatic force centroids;
   multiple feedback paths, each feedback path independently controlling an electrostatic force for a respective centroid; and
   an output unit that converts signals from the multiple feedback paths into an acceleration-responsive output signal.

2. The accelerometer of claim 1, wherein each of the feedback paths are driven by a respective loop filter.

3. The accelerometer of claim 2, wherein each of the loop filters includes a one-bit quantizer that drives the associated feedback path.

4. The accelerometer of claim 3, wherein the operation of the quantizers is time-multiplexed.

5. The accelerometer of claim 4, wherein the proof mass is moveable relative to a surface supporting the electrode arrangement, and wherein the proof mass has an undivided conductive surface capacitively coupled to each of a plurality of electrodes in the electrode arrangement.

6. The accelerometer of claim 5, further comprising a charge amplifier that converts charge accumulations caused by changes in the capacitive coupling to a voltage signal for the loop filters.

7. The accelerometer of claim 1, wherein the electrode arrangement is part of the proof mass which is moveable with respect to a surface having a second, similar arrangement.

8. The accelerometer of claim 7, wherein each of a plurality of electrodes in the electrode arrangement is coupled to a respective charge amplifier that converts capacitive coupling changes into a respective voltage signal used by one or more loop filters to provide feedback signals on the feedback paths.

9. The accelerometer of claim 8, wherein the one or more loop filters drive the feedback paths with one-bit quantizers.

10. An accelerometer that comprises:
    an electrode arrangement proximate to or part of a proof mass, the electrode arrangement providing at least three non-collinear electrostatic force centroids;
    multiple feedback paths, each feedback path independently controlling an electrostatic force for a respective centroid; and
    an output unit that converts signals from the multiple feedback paths into an acceleration-responsive output signal.

11. The accelerometer of claim 10, wherein each feedback path is driven by a respective quantizer, and where the quantizers are time-multiplexed in operation.

12. The accelerometer of claim 11, wherein each of the quantizers are part of a loop filter for the associated feedback path.

13. The accelerometer of claim 12, wherein each of the quantizers is a one-bit quantizer.

14. The accelerometer of claim 10, wherein the proof mass is moveable relative to a surface supporting the electrode arrangement, and wherein the proof mass has an undivided conductive surface capacitively coupled to each of a plurality of electrodes in the electrode arrangement.

15. An acceleration measurement method that comprises:
    obtaining at least one voltage signal representing displacement of a proof mass;
    deriving multiple feedback signals from the at least one voltage signal;
    applying the multiple feedback signals to an arrangement of electrodes that capacitively couple the proof mass to a substrate, wherein the arrangement of electrodes defines three or more centroids that are not collinear; and
    converting the multiple feedback signals into an electrical output signal representing acceleration of the substrate.

16. The method of claim 15, wherein said deriving multiple feedback signals includes:
    filtering the at least one voltage signal with multiple loop filters, each loop filter having a one-bit quantizer that outputs one of the multiple feedback signals; and
    clocking the quantizers to operate at different times.

17. The method of claim 15, wherein said applying the multiple feedback signals includes:
    applying each feedback signal to a different set of electrodes, each set of electrodes providing a corresponding electrostatic force at a different centroid on the proof mass.

18. The method of claim 15 further comprising:
    utilizing the electrical output signal representing acceleration of the substrate to acquire geophysical data or navigational data for geophysical equipment.

* * * * *